UNITED STATES PATENT OFFICE.

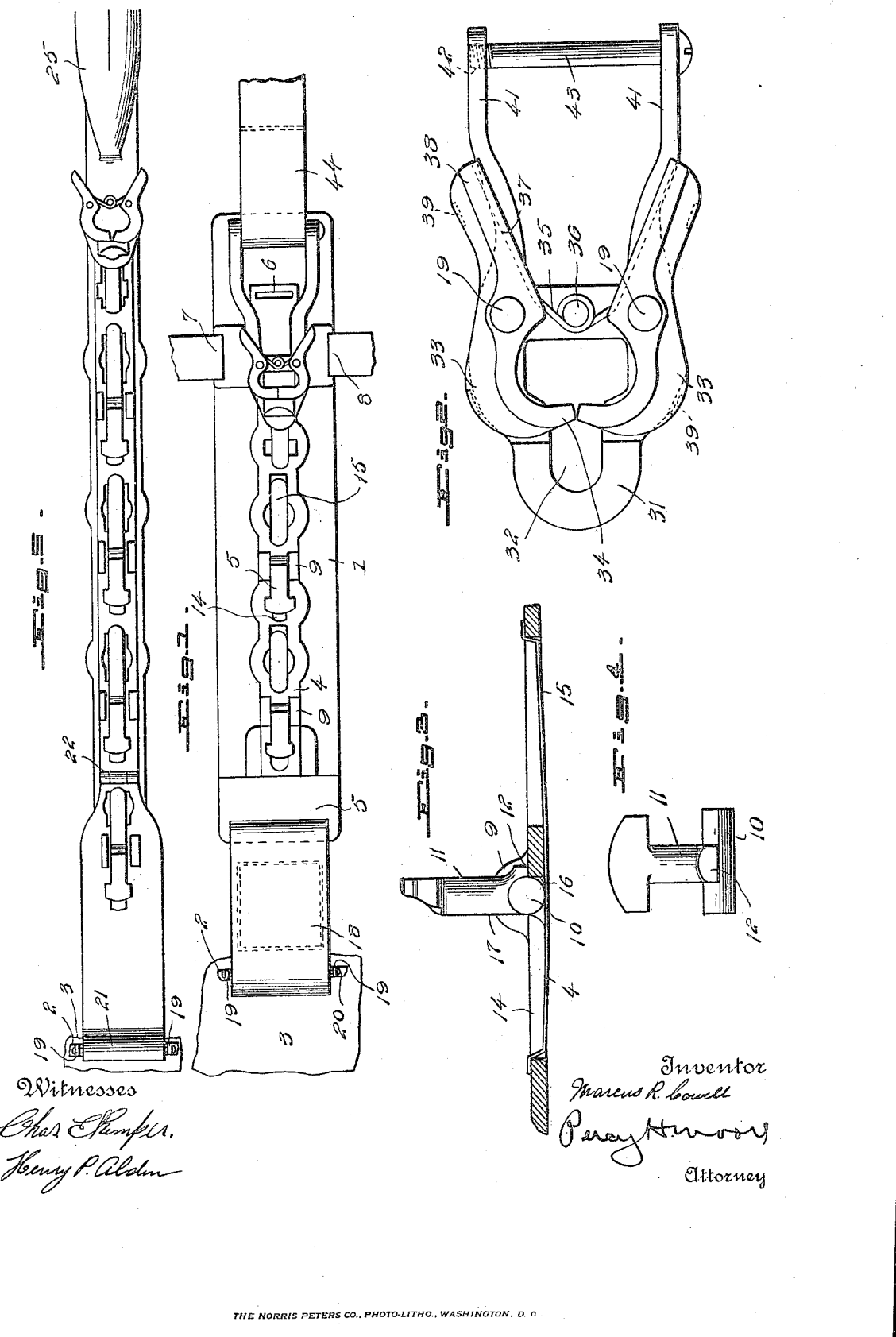

MARCUS RAY COWELL, OF MINNEAPOLIS, MINNESOTA.

DRAFT DEVICE.

1,123,993.      Specification of Letters Patent.      Patented Jan. 5, 1915.

Application filed March 21, 1913. Serial No. 756,059.

*To all whom it may concern:*

Be it known that I, MARCUS RAY COWELL, citizen of the United States of America, residing at Minneapolis, in the county of Hennepin and State of Minnesota, have invented certain new and useful Improvements in Draft Devices, of which the following is a specification.

This invention relates to certain new and useful improvements in harness draft connections for vehicles and has for an object to provide a device of this character whereby draft animals of different lengths of body may be quickly and expeditiously hitched to a vehicle.

Another object of the invention is to provide a device designed for use in connection with double harness and which may be applied to the draft and hold-back connections of any form of harness commonly used.

A further object of the invention is to provide such a device which may be used in connection with single harness to eliminate the necessity of trace connections and swingletrees.

Other and further objects and advantages of the invention will be hereinafter set forth and the novel features thereof defined by the appended claim.

In the drawing Figure 1 is a side elevation of the device; Fig. 2 is a detail plan of the trace attaching device; Fig. 3 is a longitudinal section showing one of the pins in elevation; Fig. 4 is a detail of one of the pins detached; and Fig. 5 is a modification of the invention.

Like numerals of reference refer to like parts in the several figures of the drawing.

The numeral 1 designates a draft strap adapted to be removably attached to the hames 2 of a collar 3 in a manner later described. Secured to the strap, in any preferred manner, is a base-plate 4, of any light and durable metal, terminating at its forward end in a loop or eye 5, for a purpose which will hereinafter appear, and at its rear end in loops 6, 7 and 8 in which the breeching straps of double or single harness, the back-pad and belly-band thereof may be respectively connected.

The base-plate 4 is provided at spaced intervals with a series of outwardly projecting lugs 9 forming bearings for the pivots 10 of the T-shaped or headed pins 11 which are provided with shoulders 12 adapted to seat upon the base-plate as shown in Fig. 3, when the pin is raised into right-angle position with respect to the base-plate. When not in use, the pins are adapted to be swung forwardly from such right-angle position down into recesses 14 formed in the base-plate so as to be out of the way and not liable to interfere with the rest of the harness in any manner. Each pin 11 is held in either set-up or inoperative position by means of a leaf spring 15 bearing against the base 16 or front face 17, respectively, of the pin as shown in Fig. 3.

The device may be secured to the hames of a collar in any preferred manner, as by extending the strap 1 out beyond the forward end of the base-plate 4, thence back upon itself through the loop 5 so as to form a flexible loop connection 18 with the hames, said hames having aperture ears 19 between which the loop 18 may be inserted and held by a locking pin 20 passed through the ears and loop. If desired, the forward end of the plate 4 may be provided with an eye 21 adapted for insertion between the ears 19 of the hames and secured therein as above. If the latter form of attachment be used, as in the case of a full length hame tug, the base-plate may be hinged as shown at 22 so as to more closely conform to the contour of the animal's body as in the case of a horse with prominent shoulders.

My device, as previously stated, is adapted for use in connection with single or double harness. When used with a single harness, a clip or locking member is attached about the ends of the thills of a vehicle (not shown) by means of a socket 25 at one end of the clip member, said clip being held about the ends of the thills in any desired manner, as by bolts, screws, etc., (not shown) passing through apertures in the walls of the socket 25. The opposite end of the member terminates in a reduced portion 31 having a key-hole slot 32 provided therein for a purpose later described.

Pivotally carried on the locking member are spring jaws 33, the ends 34 of which are adapted to meet, as shown in Fig. 2, and be normally held in such closed relation by means of a spring 35 detachably secured about a lug 36 on the locking member, the ends of said spring working in grooves or cut-out portions 37 in the manipulating handles 38 of the jaws 33. Each of the jaws 33 and handles 38 is provided adjacent its end with lugs 39, shown in dotted lines in Fig. 2, said lugs being adapted to bear against the outer edges of the locking member to limit the movement in either direction of the jaws 33 and handles 38. It is, of course, understood that any manner of securing the locking members to the thills may be adopted without departing from the spirit of the invention.

It will readily be seen that an animal can be quickly hitched to a vehicle by the use of my device, it only being necessary to raise into set-up position one of the T-shaped pins 11, insert the head thereof through the key-hole slot 32 of the locking member and pass it into the reduced portion of the slot wherein it is held by the spring jaws 33 and can only be removed by pressing inwardly upon the handles 38 thereof. It will further be seen that the harnessing or unharnessing is expedited through the fact that the breeching straps are secured within the loop members 6, 7 and 8 at the rear end of the base plate, and not connected with the thills.

When used in connection with double harness, the clip or locking member is provided, in place of the socket 25, shown in Fig. 5, with bifurcated arms 41, Fig. 2, having alining apertures 42 adjacent the ends thereof through which a bolt 43 may be passed and secured to hold the looped forward end of a trace 44, as shown in Fig. 1.

The invention presents an efficient and economically constructed form of harness device which may be easily and quickly assembled or disassembled for the purpose of repair of any part or parts thereof at low cost and which will conform to the contour of the draft animal's body so as to minimize the rubbing action thereon. The device permits of ready and quick adjustment to suit the different lengths of bodies of animals and when used in connection with single harness and my improved form of clip member, eliminates the necessity of trace connections so as to reduce the time required for harnessing and hitching to the minimum.

What is claimed is—

A draft device comprising a strap, a base plate secured upon said strap, said base plate being provided with outwardly projecting lugs and cut out portions, spaced connecting pins pivotally mounted in said lugs and adapted to lie within said cut out portions when in inoperative position, said pins having shoulders, springs within said cut out portions arranged to cause said shoulders to seat on said base plate to anchor said pins in operative position, and means connected to the shaft of a vehicle adapted to engage said pins.

In testimony whereof I affix my signature in presence of two witnesses.

MARCUS RAY COWELL.

Witnesses:
HENRY P. ALDEN,
W. S. J. DUNBAR.

Copies of this patent may be obtained for five cents each, by addressing the "Commissioner of Patents, Washington, D. C."